J. S. PAUL.
METALLIC VEHICLE TIRE.
APPLICATION FILED JUNE 9, 1921.
1,435,871.
Patented Nov. 14, 1922.
2 SHEETS—SHEET 1.
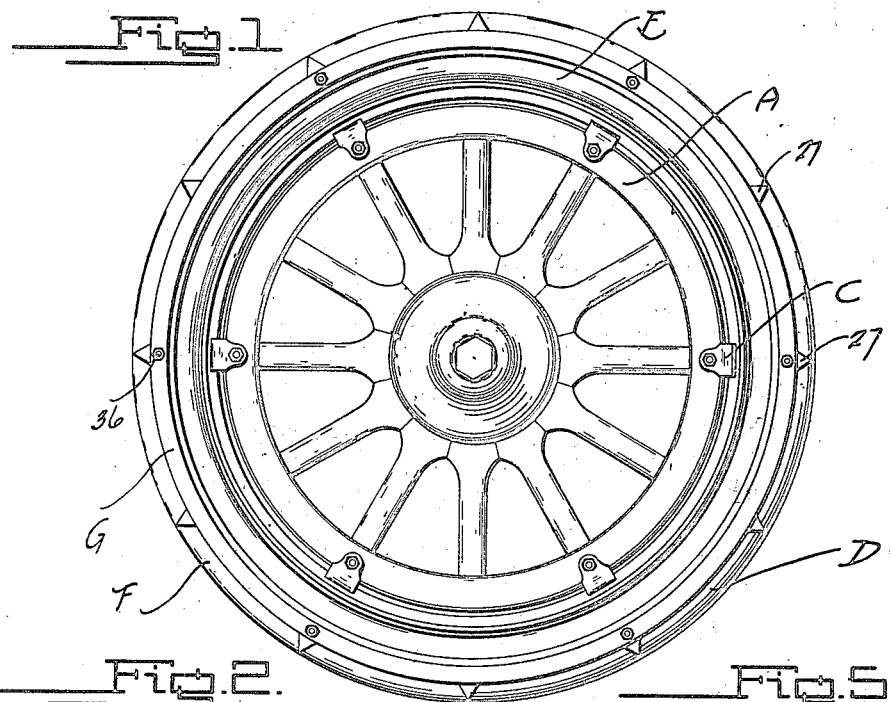
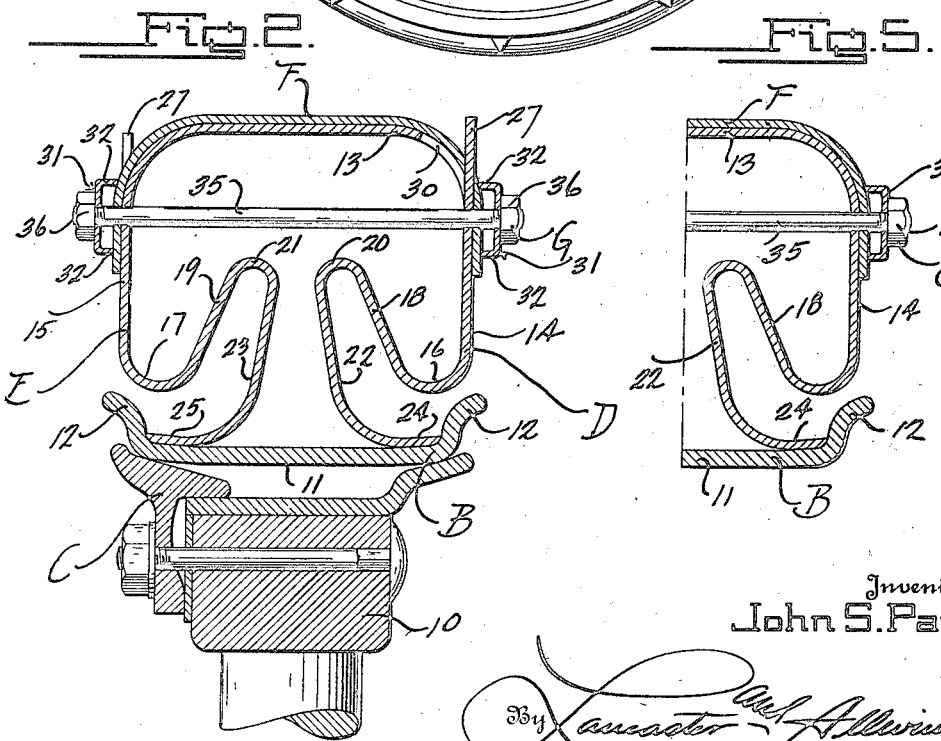
Inventor
John S. Paul
By *Lancaster & Allwine*
Attorneys

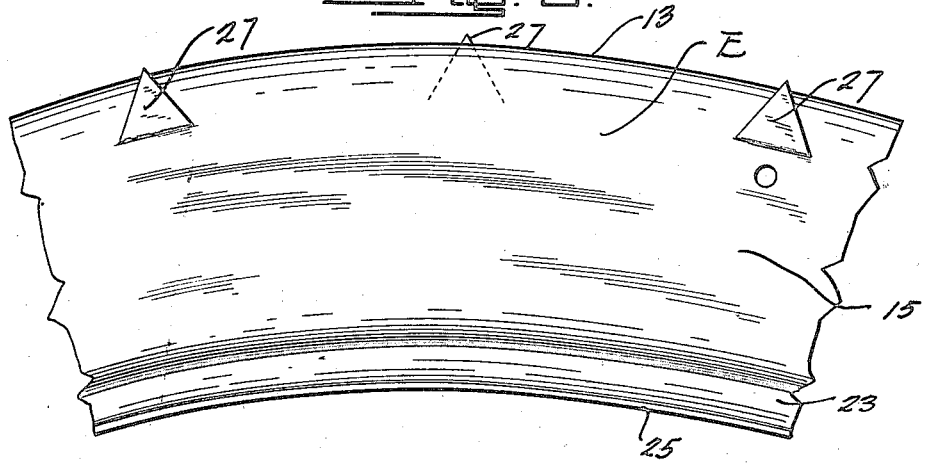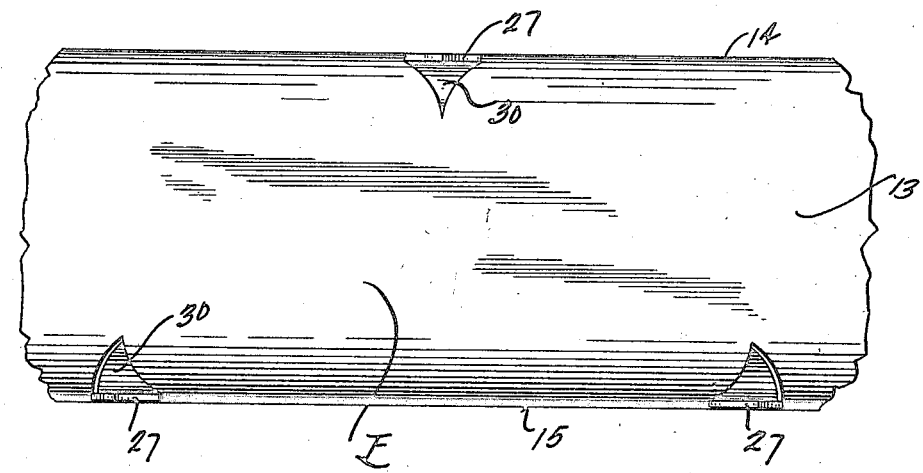

Patented Nov. 14, 1922.

1,435,871

UNITED STATES PATENT OFFICE.

JOHN S. PAUL, OF YORK BEACH, MAINE.

METALLIC VEHICLE TIRE.

Application filed June 9, 1921. Serial No. 476,295.

*To all whom it may concern:*

Be it known that I, JOHN S. PAUL, a citizen of the United States, residing at York Beach, in the county of York and State of Maine, have invented certain new and useful Improvements in Metallic Vehicle Tires, of which the following is a specification.

This invention relates to improvements in resilient tires of metallic construction.

The primary object of the invention is the provision of a tire formed of spring steel sheet material bent or otherwise shaped in tubular formation, including novel spring suspension means for mounting the tire on a wheel rim.

A further object of the invention is the provision of an improved tire of the above described character, which preferably includes a flexible tread detachably mounted to provide a noiseless, shock absorbing, and permanent tire.

Other objects and advantages will be apparent during the course of the following detailed description.

In the accompanying drawings, forming a part of this specification, and in which similar reference characters designate corresponding parts throughout the several views.

Figure 1 is a side elevation of a vehicle wheel having the improved tire mounted thereon.

Figure 2 is an enlarged transverse cross sectional view, showing the application of the tire to a vehicle rim.

Figure 3 is a fragmentary side elevation of the improved tire.

Figure 4 is a plan view of the tire illustrated in Figure 3.

Figure 5 is a fragmentary cross sectional view taken through a portion of the tire and vehicle rim.

In the drawings, wherein for the purpose of illustration is shown a preferred embodiment of my invention, the letter A designates a vehicle wheel of ordinary construction, having the ordinary demountable rim B wedged thereon, as by means C. The improved tire D preferably includes the resilient metal body E; the tread F; and the clamping means G for maintaining the tread upon the body E.

The wheel A can, of course, be of any standard type, including a felly 10, upon which the rim B is maintained in expansible manner by the ordinary wedge clamp means C, illustrated in Figure 2. The rim B preferably includes one having the ordinary base 11, with circumferentially outstanding retaining flanges 12.

The metallic tire body E is preferably formed of a single piece of sheet material, bent or formed for detachable mounting on the rim B. The body E, preferably, is designed to have the substantially flat tread surface 13, from which the substantially vertical sides 14 and 15 are bent, at right angles to the flat portion 13. The point of juncture of the sides 14 and 15 with the surface 13, is preferably arcuated in a curve of relatively long radius, to provide resiliency in the tire. The sides 14 and 15 are curved inwardly of the body E, in compound manner, for mounting upon the vehicle rim B to give the necessary stability and rigidity to the tire C. The sides 14 and 15 are first arcuated inwardly at 16 and 17; substantially straight spring portions 18 and 19 being converged upwardly into the interior of the body E. The extreme ends 20 and 21 upon the inwardly extending spring members 18 and 19, are arcuated toward the center of the body E and extend downwardly in diverging manner to form the web spring supporting legs 22 and 23 respectively. The legs 22 and 23 are provided with the outwardly arcuate spring flanges 24 and 25 respectively; the extreme ends of said spring flanges 24 and 25 being formed to lie in substantially parallel relation to the top flat portion 13 of the metallic body.

Pointed calk projections 27 are struck upwardly out of the body E, into alignment with the sides 14 and 15, the same projecting upwardly toward the tread surface 13. The projections 27, are provided in staggered relation upon the sides 14 and 15, at spaced intervals, so that the same may serve as ground engaging calks.

The tread F, is preferably a strip of flexible material, such as rubber, fabric, or leather belting, the same being provided to overlie the flat top surface 13 of the metallic body, and extending for a short distance inwardly upon each of the sides 14 and 15. The same has been provided to do away with noise incident to the rolling of a metallic body over a roadway, and to cover up the openings 30 in the body E, said openings having been placed in said body by reason of the calks 27 struck therefrom. In this manner, the tread F will close all of the openings 30, circumferentially about the tire, and permit the upward projection of the calks 27. Attention is called to the fact that the calks 27 will project upwardly until their extreme pointed ends lie flush with the top of the tread F.

The tread F can be applied to the body in any suitable manner. It is preferred, however, that a circular ring 31 of channel shaped formation be provided for overlying each portion of the tread which projects upon the sides 14 and 15. The legs 32 of the channel members, are adapted for engaging the overlying portions of the tread F, upon each side of the tire D. Said channels 31, are preferably provided with suitable openings therein; and aligning with suitable apertures in the tread and body E, whereby bolts 35 can be disposed through the tire D at spaced intervals, the same having suitable screw threaded ends projecting outwardly from the aligning apertures of opposite channel members 31. Nuts 36 are provided for engaging the projecting screw threaded ends of the bolts 35, said nuts adapted to contact the exterior of the channels 31, and for adjustment to securely bind the channels 31 to hold the tread member F upon the outer circumference of the body E.

In assembling the improved tire D upon the rim B, said rim is permitted to contract by releasing the wedge expanding means C, and when so contracted the tire D can be placed over the retaining flanges 12, until the rim seating flanges 24 and 25 of the body E are disposed upon the base 11 of the rim B. In this position, the extreme ends of the seating flanges 24 and 25 circumferentially abut the retaining flanges 12 of the rim B. The rim B is then expanded into position, by the means C, until the tire D is securely mounted upon the rim B.

As the vehicle wheel A rolls over the ground, the tread member F will contact directly with a road surface, and will resiliently support the vehicle, upon which the wheel A is mounted. The inwardly converging portions 18 and 19 act intermediate sides 14 and 15 and the webs 22 and 23 to resiliently support the sides 14 and 15, as well as the top 13 of the body. The downwardly diverging webs 22 and 23, are so formed upon the portions 18 and 19 as to maintain the body E to secure maximum resiliency from the portions 18 and 19, while at the same time, effectively balancing the tire D in stable manner upon the rim B, against any lateral thrust. Thus, should one side of the tire D hit a stone, the tendency would be to force the tire outwardly toward the opposite side of the vehicle wheel. This will of course, be counteracted by the diverging legs 22 and 23, which extend circumferentially about the rim B, and are seated thereon by the flanges 24 and 25. The tire D may of course, be constructed without the calk members 27, if the vehicle to which the tire D is attached should be one not susceptible of skidding. However, the openings 30 in the body E are closed by the tread member F, and no sand, stones or other articles will be able to pass into the interior of the tire D.

Various changes in the shape, size and arrangement of parts, may be made to the form of the invention herein shown and described, without departing from the spirit of the invention or the scope of the claims.

I claim:

1. A tire formed of a single piece of spring sheet metal providing a tread portion and flat side portions connected to said tread portion by arcuate portions, said tire having calks struck outwardly from the arcuate portions and extending outwardly of the tread portion in alignment with the side portions, and means resiliently supporting the side and tread portions of said tire.

2. A tire, having calk projections struck outwardly therefrom upon the crown portion thereof, and a casing mounted on said tire to form a tread therefor with said calks extending outwardly therefrom.

3. A tire, comprising in combination a single piece of sheet material having calk projections struck outwardly therefrom, and leaving openings in said sheet material, and a tread casing for said body adapted for disposition thereover to seal the openings provided by striking said calk members outwardly, said calk members projecting from said tread casing.

4. A tire, comprising in combination a metallic body portion, a tread casing, clamp rings laterally engaging said body and the sides of said tread casing, and means detachably engaging said body transversely for mounting said clamp rings to secure said tread to the body.

5. A tire, comprising in combination a resilient metallic body having calks struck outwardly therefrom, a flexible tread casing, clamp rings and bolts extending transversely through the body of said tire and adapted for clamping said rings tightly against the sides of said tread, for securing said tread to the tire.

6. In a tire, the combination with a wheel and rim, of a tire of spring sheet material including a tread portion, sides, and supporting portions converging inwardly of said tire from the sides thereof and then diverging outwardly of said tire to provide for seating of the same on the wheel rim to resiliently support the sides and tread portion of the tire.

7. In a tire, the combination with a wheel and demountable rim, of a metallic body of resilient sheet material including a substantially flat crown portion, vertical sides extending substantially at right angles to said crown portion, intermediate supporting portions bent inwardly of said body, and outwardly converging web portions bent from said intermediate portions, arcuating outwardly to provide flanges for engagement upon said tire rim.

JOHN S. PAUL.